(12) United States Patent
Zhang et al.

(10) Patent No.: US 12,518,380 B2
(45) Date of Patent: Jan. 6, 2026

(54) CAPSULE ENDOSCOPE IMAGE RECOGNITION METHOD BASED ON DEEP LEARNING, AND DEVICE AND MEDIUM

(71) Applicant: ANKON TECHNOLOGIES CO., LTD, Wuhan (CN)

(72) Inventors: Hang Zhang, Wuhan (CN); Hao Zhang, Wuhan (CN); Wenjin Yuan, Wuhan (CN); Chukang Zhang, Wuhan (CN); Hui Liu, Wuhan (CN); Zhiwei Huang, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 332 days.

(21) Appl. No.: 18/260,528

(22) PCT Filed: Dec. 14, 2021

(86) PCT No.: PCT/CN2021/137938
§ 371 (c)(1),
(2) Date: Jul. 6, 2023

(87) PCT Pub. No.: WO2022/148216
PCT Pub. Date: Jul. 14, 2022

(65) Prior Publication Data
US 2024/0070858 A1 Feb. 29, 2024

(30) Foreign Application Priority Data

Jan. 6, 2021 (CN) .......................... 202110010379.4

(51) Int. Cl.
*G06V 10/771* (2022.01)
*G06T 5/20* (2006.01)
(Continued)

(52) U.S. Cl.
CPC .............. *G06T 7/0012* (2013.01); *G06T 5/20* (2013.01); *G06T 7/11* (2017.01); *G06T 7/20* (2013.01);
(Continued)

(58) Field of Classification Search
None
See application file for complete search history.

(56) References Cited

U.S. PATENT DOCUMENTS 7,336,803 B2 * 2/2008 Mittal ................... G06V 10/28
348/169
2005/0286764 A1 * 12/2005 Mittal ................... G06T 7/269
382/181
(Continued)

FOREIGN PATENT DOCUMENTS

CN 103984957 A 8/2014
CN 109886358 A 6/2019
(Continued)

*Primary Examiner* — Tsung Yin Tsai
(74) *Attorney, Agent, or Firm* — Treasure IP Group, LLC

(57) ABSTRACT

A capsule endoscope image recognition method based on deep learning, and a device and a medium is provided. After a plurality of frames of continuously captured images are processed to form an image sequence of a specific format, multi-channel recognition is performed on the plurality of frames of images by means of a 3D convolutional neural network model, and a recognition result is then output in combination with a recognition probability of each channel, such that the image recognition precision is improved.

10 Claims, 3 Drawing Sheets

(51) Int. Cl.
  *G06T 7/00* (2017.01)
  *G06T 7/11* (2017.01)
  *G06T 7/20* (2017.01)
  *G06V 10/764* (2022.01)

(52) U.S. Cl.
  CPC .......... *G06V 10/764* (2022.01); *G06V 10/771* (2022.01); *G06T 2207/10068* (2013.01); *G06T 2207/20084* (2013.01)

(56) References Cited

U.S. PATENT DOCUMENTS

| | | | |
|---|---|---|---|
| 2012/0225719 A1* | 9/2012 | Nowozin | G06F 3/017 463/36 |
| 2020/0210708 A1 | 7/2020 | Jia et al. | |
| 2024/0090846 A1* | 3/2024 | Lee | A61B 5/0077 |

FOREIGN PATENT DOCUMENTS

| | | |
|---|---|---|
| CN | 110222574 A | 9/2019 |
| CN | 110705463 A | 1/2020 |
| CN | 111383214 A | 7/2020 |
| CN | 111462082 A | 7/2020 |

* cited by examiner

CAPSULE ENDOSCOPE IMAGE RECOGNITION METHOD BASED ON DEEP LEARNING, AND DEVICE AND MEDIUM

CROSS-REFERENCE OF RELATED APPLICATIONS

The application is a National Phase Application of PCT International Application No. PCT/CN2021/137938, International Filing Date Dec. 14, 2021, published Jul. 14, 2022 as International Publication Number WO2022/148216A1, which claims priority from Chinese Patent Application No. 202110010379.4, filed Jan. 6, 2021, all of which are incorporated herein by reference in their entirety.

FIELD OF INVENTION

The present invention relates to the field of medical device imaging, and more particularly to a capsule endoscope image recognition method based on deep learning, an electronic device, and a readable storage medium.

BACKGROUND

Capsule endoscope is a medical device that incorporates essential parts like a camera and a wireless transmission antenna. It captures images inside digestive tract and synchronously transmits the images to the outside for medical analysis. During an examination, the capsule endoscope captures tens of thousands of images, making the task of reviewing the images laborious and time-consuming. With the development of technology, the use of image processing and computer vision techniques for lesion recognition has gained widespread attention.

In the prior art, Chinese patent application with publication number CN103984957A discloses an automatic warning system for regions with suspicious lesions in capsule endoscopic images. This system uses an image enhancement module to adaptively enhance the images, then detects the texture features of flat lesions through a texture feature extraction module, and finally classifies them by a classification warning module, realizing the detection and warning functions for flat lesions in the small bowel.

Chinese patent application with publication number CN111462082A discloses a lesion image recognition device, a method, an apparatus, and a readable storage medium, which uses a trained 2D target deep learning model to perform lesion recognition on a single image.

The solutions mentioned in the prior art are all for recognizing a single image, and during the recognition process, only the information captured in a single image can be used, and the image information captured before and after cannot be comprehensively used. In this way, images captured from a single angle cannot intuitively reflect the overall status of the lesion, especially images of gastrointestinal folds and gastric walls captured at certain specific angles are easily confused with lesions such as polyps and bulges. Additionally, in the prior art, the spatial and temporal information from the captured content cannot be obtained simultaneously, and the accuracy rate of lesion identification is low.

SUMMARY OF THE INVENTION

In order to solve the technical problems existing in the art, the present invention provides a capsule endoscope image recognition method based on deep learning, an electronic device, and a readable storage medium.

In order to achieve one of the above purposes of the present invention, one embodiment of the present invention is to provide a capsule endoscope image recognition method based on deep learning, the method comprising: collecting N original images in a chronological order using a capsule endoscope;
- segmenting the N original images into M groups of equal-sized original image sequences using a sliding window segmentation method;
- analyzing the N original images or the M groups of RGB image sequences to form M groups of optical flow image sequences;
- wherein, each of the RGB image sequences is composed of image data in RGB format, and each of the optical flow image sequences is composed of image data obtained by calculating optical flow fields of adjacent RGB images;
- inputting the RGB image sequences and the optical flow image sequences respectively into a 3D convolutional neural network model to output a recognition result, wherein the recognition result is a probability value of the occurrence of a preset parameter; and the 3D convolutional neural network model comprises: a RGB branch and an optical flow branch;
- wherein, the step "inputting the RGB image sequences and the optical flow image sequences respectively into a 3D convolutional neural network model to output a recognition result" comprises:
- inputting the RGB image sequences into the RGB branch for calculation to output a first classification probability p1;
- inputting the optical flow image sequences into the optical flow branch for calculation to output a second classification probability p2; and
- combining the first classification probability and the second classification probability to produce the recognition result p;

$$p = w_1 * p1 + w_2 * p2;$$

$$w_1 = T1/(T1+T2),$$

$$w_2 = T2/(T1+T2);$$

wherein, T1 and T2 represent the recognition accuracy of a validation set in the RGB branch and the optical flow branch, respectively, during the process of constructing the 3D convolutional neural network model.

In an embodiment of the present invention, the step "segmenting the N original images into M groups of equal-sized original image sequences using a sliding window segmentation method" comprises:
- numbering the N original images in a chronological order, to be 1, 2, ..., N;
- segmenting the N original images sequentially with a preset window size K and a preset sliding step S, into M groups of original image sequences, wherein, $$M = \left\lceil \frac{N-K}{S} \right\rceil + 1.$$

In an embodiment of the present invention, the preset window size K has a value range of $2 \leq K \leq 1000$, and the preset sliding step length S has a value range of $1 \leq S < K$.

In an embodiment of the present invention, the training method for the 3D convolutional neural network model comprises:
  copying parameters of 2D convolution kernels with a size of N*N in a pre-trained 2D recognition model N times, wherein the 2D recognition model is obtained by training images with lesion labels, and its input is a single-frame image, and it only recognizes single-frame images;
  dividing the copied parameters of each kernel by N respectively, so that the kernel parameter at each position is ⅓ of the original value;
  combining the new kernel parameters to produce a convolution kernel parameter with a size of N*N*N, to constitute an initialization parameter of the 3D convolution kernel in the 3D convolutional neural network model;
  training the 3D convolutional neural network model with initialized parameters using a stochastic gradient descent method, and iteratively updating the parameters of the model until an iteration stop condition is met, and a 3D convolutional neural network model for outputting the recognition result is generated.

In an embodiment of the present invention, according to the sequential arrangement of the processing flow, the 3D convolutional neural network model comprises:
  a 7*7*7 3D convolutional layer, a 3*3*3 3D pooling layer, at least one collaborative spatio-temporal feature structure, a 3D pooling layer, and a fully connected layer.

In an embodiment of the present invention, the number of the collaborative spatio-temporal feature structures is P, wherein P∈(4, 16);
  according to the sequential arrangement of the processing flow from input to output, wherein the collaborative spatio-temporal feature structure comprises: a first collaborative spatio-temporal convolutional layer, a first normalization layer, an activation layer, and a fast connection layer that is executed in parallel with the first collaborative spatio-temporal convolutional layer, the first normalization layer and the activation layer, covering the process from input to output of the collaborative spatio-temporal feature structure.

In an embodiment of the present invention, according to the sequential arrangement of the processing flow from input to output, the collaborative spatio-temporal feature structure further comprises: a second collaborative spatio-temporal convolutional layer and a second normalization layer located after the activation layer.

In an embodiment of the present invention, the data processing process of the first collaborative spatio-temporal convolutional layer comprises:
  decomposing an entrance input feature map into three views, represented by H–W, T–H, and T–W respectively,
  configuring output features for the three views, represented by $x_{hw}$, $x_{tw}$, and $x_{th}$, respectively, then:

$$x_{hw} = x \otimes w_{1 \times 3 \times 3},$$

$$x_{tw} = x \otimes w_{3 \times 1 \times 3},$$

$$x_{th} = x \otimes w_{3 \times 3 \times 1},$$

wherein, x is the input data of (t×h×w)×$c_1$, t×h×w is the size of the input feature map, $c_1$ is the number of channels of the input feature map, ⊗ represents 3D convolution, and w represents the convolution filter kernel;

calculating a weighted sum of the three sets of input data to obtain an output y of the first collaborative spatio-temporal convolutional layer:

$$y = [a_{hw}, a_{tw}, a_{th}] \begin{bmatrix} x_{hw} \\ x_{tw} \\ x_{th} \end{bmatrix},$$

wherein, $[a_{hw}, a_{tw}, a_{th}]$ is the coefficient of the size $c_2 \times 3$, and $[a_{hw}, a_{tw}, a_{th}]$ is normalized using softmax, $c_2$ represents the number of output channels, and the number 3 indicates three views.

In order to achieve one of the above purposes of the invention, one embodiment of the present invention is to provide an electronic device, comprising a memory and a processor, wherein, the memory stores a computer program that can run on the processor, and the processor executes the computer program to implement steps of the capsule endoscope image recognition method based on deep learning as described above.

In order to achieve one of the above purposes of the invention, one embodiment of the present invention is to provide a computer-readable storage medium for storing a computer program. The computer program is executed by the processor to implement the steps of the capsule endoscope image recognition method based on deep learning as described above.

Compared with the prior art, the beneficial effects of the present invention are: the capsule endoscope image recognition method based on deep learning, the device and the medium of the present invention, after a plurality of frames of continuously captured images are processed to form an image sequence of a specific format, multi-channel recognition is performed on the plurality of frames of images by means of a 3D convolutional neural network model, and a recognition result is then output in combination with a recognition probability of each channel, such that the image recognition precision is improved.

DETAILED DESCRIPTION

The present invention can be described in detail below with reference to the accompanying drawings and preferred embodiments. However, the embodiments are not intended to limit the present invention, and the structural, method, or functional changes made by those skilled in the art in accordance with the embodiments are included in the scope of the present invention.

Figure 1:
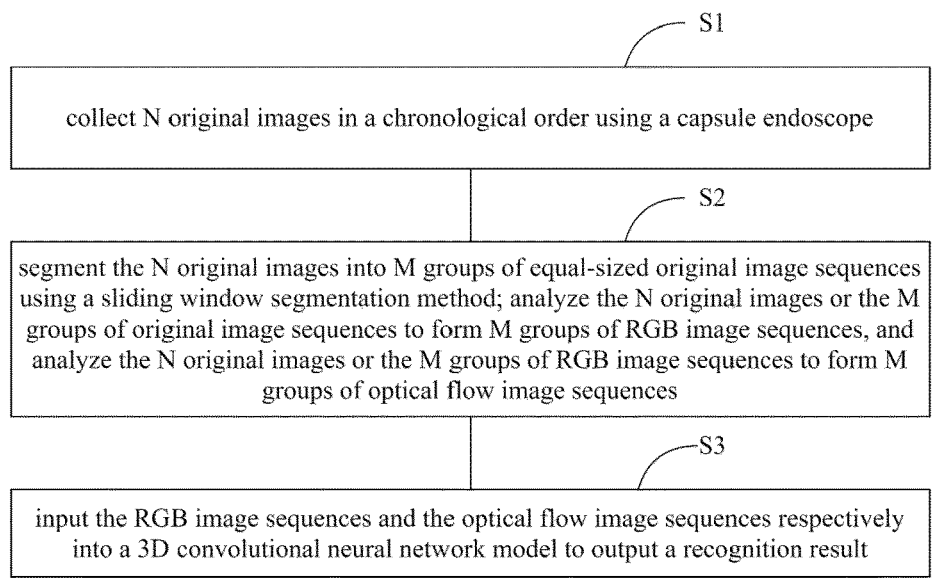
FIG. 1 is a schematic flowchart of a capsule endoscope image recognition method based on deep learning, according to a first embodiment of the present invention.

As shown in FIG. 1, a capsule endoscope image recognition method based on deep learning is provided in a first embodiment of the present invention, the method comprising:

step S1, collecting N original images in a chronological order using a capsule endoscope;

step S2, segmenting the N original images into M groups of equal-sized original image sequences using a sliding window segmentation method;

analyzing the N original images or the M groups of original image sequences to form M groups of RGB image sequences, and analyzing the N original images or the M groups of RGB image sequences to form M groups of optical flow image sequences;

where, each of the RGB image sequences is composed of image data in RGB format, and each of the optical flow image sequences is composed of image data obtained by calculating optical flow fields of adjacent RGB images;

step S3, inputting the RGB image sequences and the optical flow image sequences respectively into a 3D convolutional neural network (CNN) model to output a recognition result, where the recognition result is a probability value of the occurrence of a preset parameter.

For the step S1, during the operation of the capsule endoscope, images are continuously captured by the camera disposed on the capsule endoscope, and collected and stored synchronously or asynchronously to form the original images.

For the step S2, segmenting the N original images into M groups of equal-sized original image sequences using a sliding window segmentation method, including: numbering the N original images in a chronological order, to be 1, 2, . . . , N; segmenting the N original images sequentially with a preset window size K and a preset sliding step S, into M groups of original image sequences, where, $$M = \left\lceil \frac{N-K}{S} \right\rceil + 1.$$

Specifically, after segmentation, the first group of original image sequences consists of original images numbered 1, 2, . . . , K, the second group of original image sequences consists of original images numbered S+1, S+2, . . . , S+K, and after segmentation in sequence, the last group of original image sequences consists of original images numbered N−K, N−K+1, . . . , N. In total, the original images are segmented into $$\left\lceil \frac{N-K}{S} \right\rceil + 1$$

groups of original image sequences, where the symbol ⌈ ⌉ in the formula represents rounding up. Preferably, the value range of K is 2≤K≤1000, and the value range of S is 1≤S<K.

It should be noted that if N cannot be divided evenly by K, there is a group of original image sequences with a quantity not equal to K. Preferably, the group of original image sequences with a quantity not equal to K is set as the first group or the last group. Typically, for the convenience of calculation, the number N of original images selected for calculation can be divided evenly by K without remainder, and no further elaboration is needed here.

Figure 2:
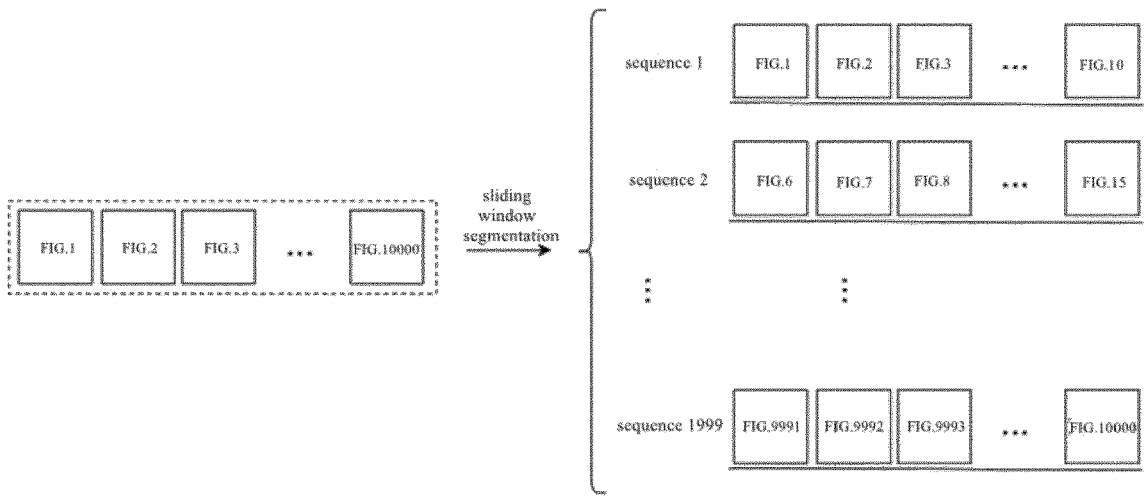
FIG. 2 is a schematic illustration of a sliding window segmentation provided by a specific example of the present invention.

As shown in FIG. 2, in a specific example of the present invention, the total number of original images is N=10000, the size of the sliding window is set to K=10, and the sliding step is set to S=5. Therefore, after segmentation, the first group of original image sequences is composed of original images 1, 2, . . . , 10, the second group of original image sequences is composed of original images 6, 7, . . . , 15, and so on, until the last group of original image sequences is composed of original images 9991, 9992, . . . , 10000, resulting in a total of 1999 original image sequences.

Accordingly, analyzing N original images or analyzing M groups of original image sequences to form M groups of RGB image sequences, where each of RGB image sequences is composed of image data in RGB format. Specifically, each original image in the original image sequences is converted into an RGB format image respectively, so that each original image sequence produces a corresponding RGB image sequence. It should be noted that it is also possible to first convert N original images to RGB format, and then use the same sliding window segmentation method as that used to form the original image sequences to form M groups of RGB image sequences. The RGB image sequences formed by the two methods mentioned above are the same.

Additionally, if the original images are in RGB format, there is no need for further conversion, and the original image sequences are the RGB image sequences, which is not further elaborated here.

Accordingly, analyzing the N original images or the M groups of RGB image sequences to form M groups of optical flow image sequences, similar to the formation process of RGB image sequences, the original images can be directly analyzed to obtain optical flow images, and then the optical flow images are segmented to form the M groups of optical flow image sequences using the same sliding window segmentation method as that used to form the original image sequences; alternatively, the original image sequences may be analyzed to directly form optical flow image sequences. Specifically, taking the original image sequence as an example, the steps including: first converting the original image sequences into RGB image sequences, then, calculating optical flow fields of adjacent RGB images to obtain the optical flow field image data. When the original images are known, obtaining the RGB images and optical flow images corresponding to the original images is prior art, therefore, it is not elaborated herein.

For the step S3, the 3D convolutional neural network model comprises: a RGB branch and an optical flow branch;

inputting the RGB image sequences into the RGB branch for calculation to output a first classification probability p1;

inputting the optical flow image sequences into the optical flow branch for calculation to output a second classification probability p2;

combining the first classification probability and the second classification probability to produce the recognition result p;

$p = w_1 * p1 + w_2 * p2;$ $w_1 = T1/(T1+T2),$ $w_2 = T2/(T1+T2);$ where, T1 and T2 represent the recognition accuracy of a validation set in the RGB branch and the optical flow branch, respectively, during the process of constructing the 3D convolutional neural network model.

Specifically, the recognition accuracy is the probability of successful recognition.

In a specific example of the present invention, T1=0.9, T2=0.8, then, $w_1$=0.9/(0.9+0.8)=0.53, and $w_2$=0.8/(0.9+0.8)=0.47.

In practical applications, the recognition result is the probability of lesions being present in the current image sequence, and the lesions such as hemorrhage, ulcer, polyp, erosion, etc. The greater the value of the recognition result p, the greater the probability of the presence of the lesion.

Accordingly, the RGB branch models the local spatio-temporal information, which can effectively describe the shape and contour of the captured content; the optical flow branch models the changes between adjacent frame images, which can effectively capture the dynamic changing process of the captured content caused by the movement of the capsule endoscope, and which is contributed to recovering the global spatial information. Therefore, the same image sequence is converted to form two types of data, which are then separately recognized and output through the two constructed branches, and the results of the two branches are further combined to improve the recognition effect.

In the specific embodiments of the present invention, the construction methods for the RGB branch and the optical flow branch are the same. In the following description of the present invention, the two branches are generalized in terms of a 3D convolutional neural network model. The 3D convolutional neural network model can encode spatial and temporal information simultaneously by extending the convolution kernel from two-dimension to three-dimension, so that lesion recognition is performed on a plurality of images, the captured information at different angles by continuously captured adjacent images is comprehensively utilized, compared to single-frame image recognition by a 2D convolutional neural network model, more information can be used, thus improving recognition accuracy.

Specifically, the training method for the 3D convolutional neural network model includes:

step M1, copying parameters of 2D convolution kernels with a size of N*N in a pre-trained 2D recognition model N times, where the 2D recognition model is obtained by training images with lesion labels, and its input is a single-frame image, and it can only recognize single-frame images; where, the construction and application of the 2D recognition model are both in the prior art, such as the content disclosed in the Chinese patent application CN111462082A as described in the background, which is not elaborated here;

step M2, dividing the copied parameters of each kernel by N respectively, so that the kernel parameter at each position is ⅓ of the original value;

step M3, combining the new kernel parameters to produce a convolution kernel parameter with a size of N*N*N, to constitute an initialization parameter of the 3D convolution kernel in the 3D convolutional neural network model.

Figure 3:
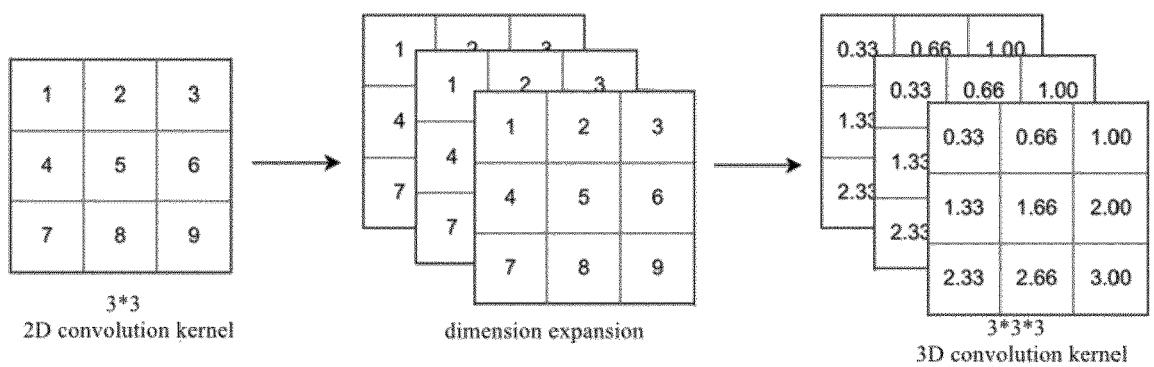
FIG. 3 is a schematic illustration of initialization parameters of convolution kernel of a 3D convolutional neural network model generated by using parameters of convolution kernel of a trained 2D recognition model provided by a specific example of the present invention.

Specifically, as shown in FIG. 3, the 3*3 convolution kernel of the 2D recognition model is copied three times for dimension expansion; further, the data of each dimension is divided by 3 separately, to form the initialization parameters of the 3*3*3 3D convolution kernel.

Further, the training method for the 3D convolutional neural network model also includes: step M4, training the 3D convolutional neural network model with initialized parameters using a stochastic gradient descent method, and iteratively updating the parameters of the model until the iteration stop condition is met, and a 3D convolutional neural network model for outputting the recognition result is generated.

Figure 4:
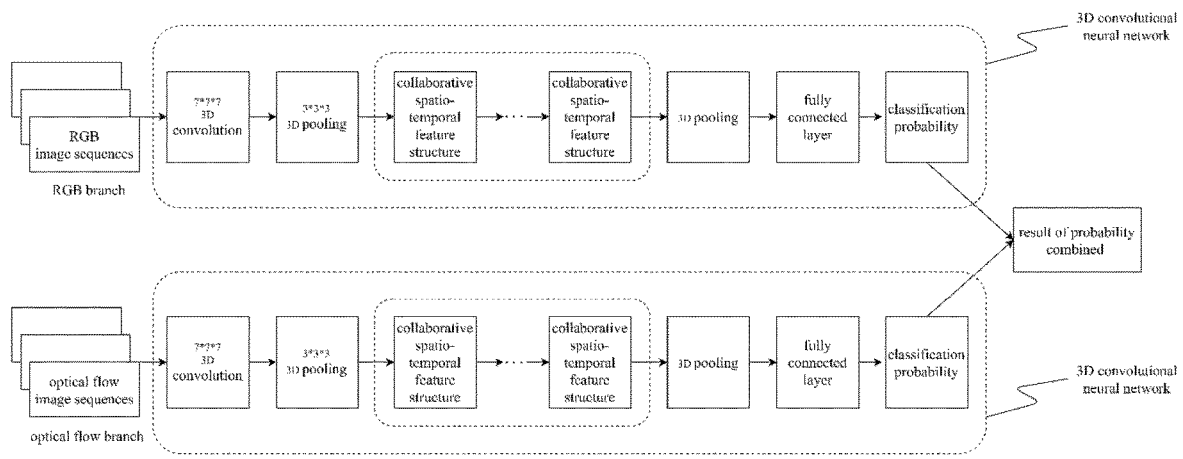
FIG. 4 is a schematic structural illustration of the 3D convolutional neural network model provided by the present invention.

Preferably, as shown in FIG. 4, according to the sequential arrangement of processing flow, the 3D convolutional neural network model comprises: a 7*7*7 3D convolutional layer, a 3*3*3 3D pooling layer, at least one collaborative spatio-temporal feature structure, a 3D pooling layer, and a fully connected layer.

The number of the collaborative spatio-temporal feature structures is P, where P∈ (4, 16). In the specific embodiment of the present invention, P=8.

Figure 5:
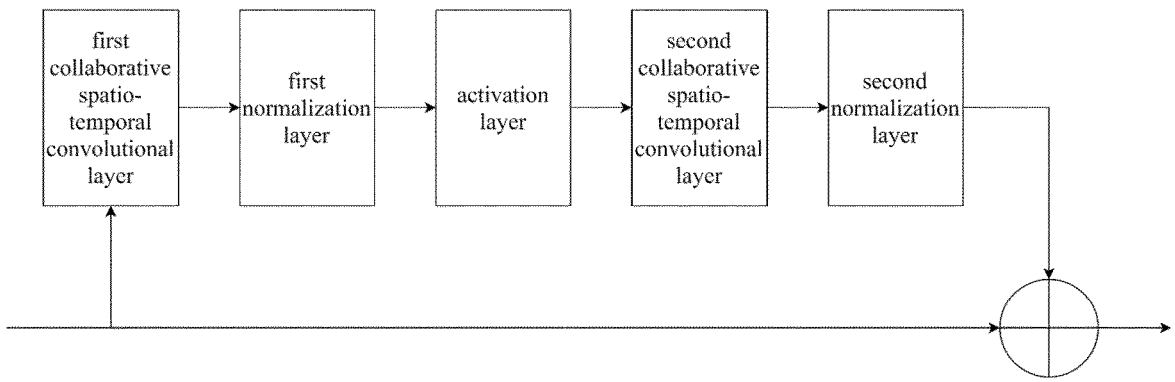
FIG. 5 is a schematic structural illustration of a collaborative spatio-temporal feature structure provided by the present invention.

Preferably, as shown in FIG. 5, according to the sequential arrangement of the processing flow from input to output, the collaborative spatio-temporal feature structure comprises: a first collaborative spatio-temporal convolutional layer, a first normalization layer, an activation layer, and a fast connection layer that is executed in parallel with the first collaborative spatio-temporal convolutional layer, the first normalization layer and the activation layer, covering the process from input to output of the collaborative spatio-temporal feature structure.

Further, according to the sequential arrangement of the processing flow from input to output, the collaborative spatio-temporal feature structure further comprises: a second collaborative spatio-temporal convolutional layer and a second normalization layer located after the activation layer.

Figure 6:
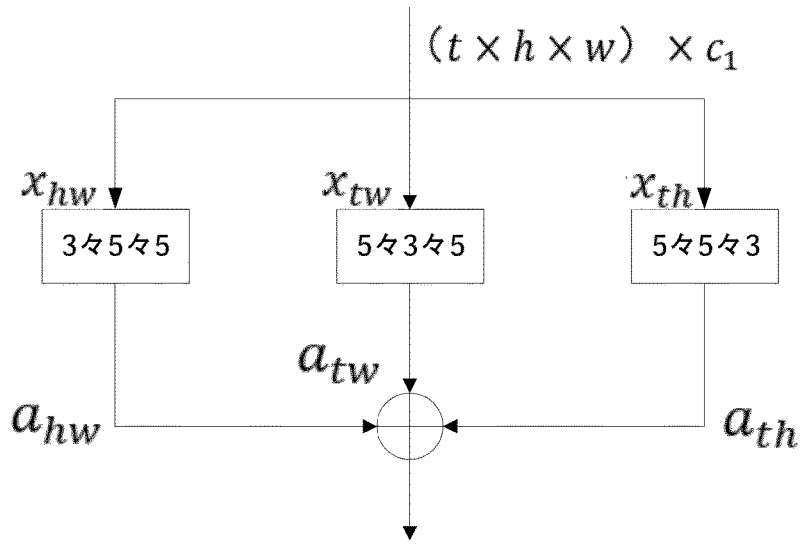
FIG. 6 is a schematic flowchart of data processing of a collaborative spatio-temporal convolutional layer, according to a specific example of the present invention.
Figure 7:
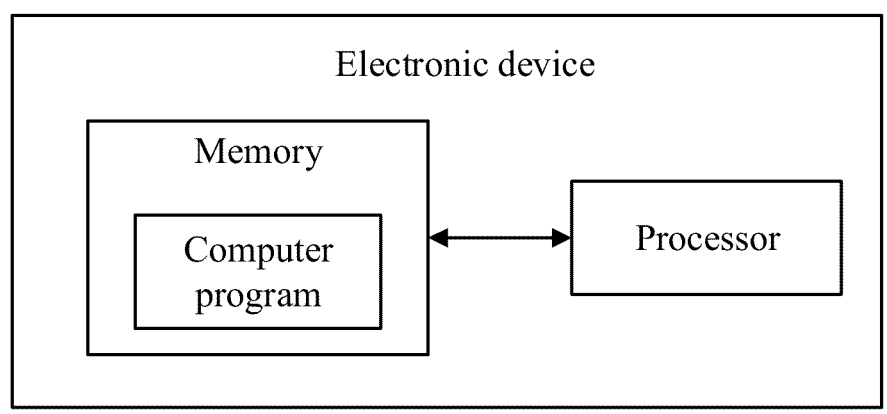
FIG. 7 is a schematic diagram of components of an exemplary electronic device in accordance with the present invention.

Preferably, as shown in FIG. 6, the processing flow of the first spatio-temporal convolutional layer and the second spatio-temporal convolutional layer are the same, and herein, both are described as the spatio-temporal convolutional layer; specifically, the data processing process of the collaborative spatio-temporal convolutional layer includes:

decomposing the entrance input feature map into three views, represented by H–W, T–H, and T–W respectively, configuring output features for the three views, represented by $x_{hw}$, $x_{tw}$, and $x_{th}$, respectively, then:

$$x_{hw}=x \otimes w_{1 \times 3 \times 3},$$

$$x_{tw}=x \otimes w_{3 \times 1 \times 3},$$

$$x_{th}=x \otimes w_{3 \times 3 \times 1},$$

where, x is the input data of (t×h×w)×$c_1$, t×h×w is the size of the input feature map, $c_1$ is the number of channels of the input feature map, ⊗ represents 3D convolution, and w represents the convolution filter kernel;

calculating a weighted sum of the three sets of input data to obtain an output y of the collaborative spatio-temporal convolutional layer:

$$y = [a_{hw}, a_{tw}, a_{th}] \begin{bmatrix} x_{hw} \\ x_{tw} \\ x_{th} \end{bmatrix},$$

where, [$a_{hw}$, $a_{tw}$, $a_{th}$] is the coefficient of the size $c_2$×3, and [$a_{hw}$, $a_{tw}$, $a_{th}$] is normalized using softmax, $c_2$ represents the number of output channels, and the number 3 indicates three views.

The collaborative spatio-temporal convolutional layer performs convolution on the three orthogonal views of the input data, separately learns spatial appearance and temporal motion, collaboratively learns spatial and temporal features by sharing convolution kernels across different views.

Normalizing $[a_{hw}, a_{tw}, a_{th}]$ using softmax can prevent the corresponding order of magnitude explosion.

Further, an embodiment of the present invention provides an electronic device, comprising a memory and a processor, where, the memory stores a computer program that can run on the processor, and the processor executes the computer program to implement the steps of the capsule endoscope image recognition method based on deep learning.

Further, an embodiment of the present invention provides a computer-readable storage medium for storing a computer program. The computer program is executed by the processor to implement the steps of the capsule endoscope image recognition method based on deep learning.

In summary, the capsule endoscope image recognition method based on deep learning, the device and the medium of the present invention, after a plurality of frames of continuously captured images are processed to form an image sequence of a specific format, multi-channel recognition is performed on the plurality of frames of images by means of a 3D convolutional neural network model, and a recognition result is then output in combination with a recognition probability of each channel, such that the image recognition precision is improved.

For the convenience of description, the device is described in various modules divided by functions separately. When implementing the present invention, the functions of the various modules can be implemented in the same or different software and/or hardware.

The device implementations described above are merely illustrative. The modules described as separate components may or may not be physically separated, and the components displayed as modules may or may not be physical modules, that is, they may be located in one place, or may also be distributed over a plurality of network modules. Some or all of the modules may be selected according to actual needs to achieve the object of the embodiment. It can be understood and implemented by ordinary persons skilled in the art without creative work.

It should be understood that, although the description is described in terms of embodiments, not every embodiment merely comprises an independent technical solution. Those skilled in the art should have the description as a whole, and the technical solutions in each embodiment may also be combined as appropriate to form other embodiments that can be understood by those skilled in the art.

The series of detailed descriptions listed above are only specific descriptions for the feasible embodiments of the present invention, and they are not used to limit the protection scope of the present invention. Changes should all be included within the protection scope of the present invention.

The invention claimed is:

1. A capsule endoscope image recognition method based on deep learning, comprising collecting N original images in a chronological order using a capsule endoscope;
segmenting the N original images into M groups of equal-sized original image sequences using a sliding window segmentation method;
analyzing the N original images or the M groups of RGB image sequences to form M groups of optical flow image sequences;
wherein, each of the RGB image sequences is composed of image data in RGB format, and each of the optical flow image sequences is composed of image data obtained by calculating optical flow fields of adjacent RGB images;
inputting the RGB image sequences and the optical flow image sequences respectively into a 3D convolutional neural network model to output a recognition result, wherein the recognition result is a probability value of the occurrence of a preset parameter; and the 3D convolutional neural network model comprises: a RGB branch and an optical flow branch;
wherein, inputting the RGB image sequences and the optical flow image sequences respectively into a 3D convolutional neural network model to output a recognition result, further comprising:
inputting the RGB image sequences into the RGB branch for calculation to output a first classification probability p1;
inputting the optical flow image sequences into the optical flow branch for calculation to output a second classification probability p2; and
combining the first classification probability and the second classification probability to produce the recognition result p;

$p = w_1 * p1 + w_2 * p2;$ $w_1 = T1/(T1+T2),$ $w_2 = T2/(T1+T2);$ wherein, T1 and T2 represent the recognition accuracy of a validation set in the RGB branch and the optical flow branch, respectively, during the process of constructing the 3D convolutional neural network model.

2. The capsule endoscope image recognition method based on deep learning of claim 1, wherein the N original images into M groups of equal-sized original image sequences using the sliding window segmentation method, further comprising:
numbering the N original images in a chronological order, to be 1, 2, . . . , N; and
segmenting the N original images sequentially with a preset window size K and a preset sliding step S, into M groups of original image sequences, wherein, M=[(N−K)/S]+1.

3. The capsule endoscope image recognition method based on deep learning of claim 2, wherein
the preset window size K has a value range of 2 K≤1000, and the preset sliding step length S has a value range of 1≤S<K.

4. The capsule endoscope image recognition method based on deep learning of claim 1, wherein
the training method for the 3D convolutional neural network model comprises:
copying parameters of 2D convolution kernels with a size of N*N in a pre-trained 2D recognition model N times, wherein the 2D recognition model is obtained by
training images with lesion labels, and its input is a single-frame image, and it only recognizes single-frame images;
dividing the copied parameters of each kernel by N respectively, so that the kernel parameter at each position is ⅓ of the original value;
combining the new kernel parameters to produce a convolution kernel parameter with a size of N*N * N, to constitute an initial parameter of the 3D convolution kernel in the 3D convolutional neural network model;

training the 3D convolutional neural network model with initialized parameters using a stochastic gradient descent method, and iteratively updating the parameters of the model until an iteration stop condition is met, and a 3D convolutional neural network model for outputting the recognition result is generated.

5. The capsule endoscope image recognition method based on deep learning of claim 1, wherein
according to the sequential arrangement of the processing flow, the 3D convolutional neural network model comprises:
a 7*7*7 3D convolutional layer, a 3*3*3 3D pooling layer, at least one collaborative spatio-temporal feature structure, a 3D pooling layer, and a fully connected layer.

6. The capsule endoscope image recognition method based on deep learning of claim 5, wherein
the number of the collaborative spatio-temporal feature structures is P,
wherein P∈(4, 16); and
according to the sequential arrangement of the processing flow from input to output,
wherein the collaborative spatio-temporal feature structure comprises:
a first collaborative spatio-temporal convolutional layer,
a first normalization layer, an activation layer, and
a fast connection layer that is executed in parallel with the first collaborative spatio-temporal convolutional layer; and
the first normalization layer and the activation layer, covering the process from input to output of the collaborative spatio-temporal feature structure.

7. The capsule endoscope image recognition method based on deep learning of claim 6,
wherein according to the sequential arrangement of the processing flow from input to output,
the collaborative spatio-temporal feature structure further comprises:
a second collaborative spatio-temporal convolutional layer and a second normalization layer located after the activation layer.

8. The capsule endoscope image recognition method based on deep learning of claim 6,
wherein the data processing process of the first collaborative spatio-temporal convolutional layer comprises:
decomposing an entrance input feature map into three views, represented by H–W, T–H, and T–W respectively,
configuring output features for the three views, represented by $x_{hw}$, $x_{tw}$, and $x_{th}$, respectively, then:

$$x_{hw}=x \otimes w_{1\times 3\times 3},$$

$$x_{tw}=x \otimes w_{3\times 1\times 3},$$

$$x_{th}=x \otimes w_{3\times 3\times 1},$$

wherein,
x is the input data of (t×h×w)×$C_1$, t×h×w is the size of the input feature map,
$c_1$ is the number of channels of the input feature map,
⊗ represents 3D convolution, and
w represents the convolution filter kernel;

calculating a weighted sum of the three sets of input data to obtain an output y of the first collaborative spatio-temporal convolutional layer:

$$y = [a_{hw}, a_{tw}, a_{th}] \begin{bmatrix} x_{hw} \\ x_{tw} \\ x_{th} \end{bmatrix},$$

wherein,
$[a_{hw}, a_{tw}, a_{th}]$ is the coefficient of the size $C_2 \times 3$, and
$[a_{hw}, a_{tw}, a_{th}]$ is normalized using softmax,
$C_2$ represents the number of output channels, and
the number 3 indicates three views.

9. An electronic device, comprising a memory and a processor, wherein the memory stores a computer program that runs on the processor, and the processor executes the program to implement steps of the capsule endoscope image recognition method based on deep learning, wherein the method comprises:
collecting N original images in a chronological order using a capsule endoscope;
segmenting the N original images into M groups of equal-sized original image sequences using a sliding window segmentation method;
analyzing the N original images or the M groups of RGB image sequences to form M groups of optical flow image sequences;
wherein,
each of the RGB image sequences is composed of image data in RGB format, and each of the optical flow image sequences is composed of image data obtained by calculating optical flow fields of adjacent RGB images;
inputting the RGB image sequences and the optical flow image sequences respectively into a 3D convolutional neural network model to output a recognition result,
wherein the recognition result is a probability value of the occurrence of a preset parameter; and the 3D convolutional neural network model comprises: a RGB branch and an optical flow branch;
wherein, inputting the RGB image sequences and the optical flow image sequences respectively into a 3D convolutional neural network model to output a recognition result, comprising:
inputting the RGB image sequences into the RGB branch for calculation to output a first classification probability p1;
inputting the optical flow image sequences into the optical flow branch for calculation to output a second classification probability p2;
combining the first classification probability and the second classification probability to produce the recognition result p;

$$p=w_1*p1+w_2*p2;$$

$$w_1=T1/(T1+T2),$$

$$w_2=T2/(T1+T2);$$

wherein, T1 and T2 represent the recognition accuracy of a validation set in the RGB branch and the optical flow branch, respectively, during the process of constructing the 3D convolutional neural network model.

10. A computer-readable non-transitory storage medium having stored thereon a computer program that,
when executed by a processor the steps of the capsule endoscope image recognition method based on deep learning, wherein the method comprises:
collecting N original images in a chronological order using a capsule endoscope;
segmenting the N original images into M groups of equal-sized original image sequences using a sliding window segmentation method;
analyzing the N original images or the M groups of RGB image sequences to form M groups of optical flow image sequences;
wherein,
each of the RGB image sequences is composed of image data in RGB format,
and each of the optical flow image sequences is composed of image data obtained by
calculating optical flow fields of adjacent RGB images;
inputting the RGB image sequences and the optical flow image sequences respectively into a 3D convolutional neural network model to output a recognition result,
wherein the recognition result is a probability value of the occurrence of a preset parameter; and the 3D convolutional neural network model comprises: a RGB branch and an optical flow branch;
wherein, inputting the RGB image sequences and the optical flow image sequences respectively into a 3D convolutional neural network model to output a recognition result, comprising:
inputting the RGB image sequences into the RGB branch for calculation to output a first classification probability p1;
inputting the optical flow image sequences into the optical flow branch for calculation to output a second classification probability p2;
combining the first classification probability and the second classification probability to produce the recognition result p;

$p = w_1 * p1 + w_2 * p2;$ $w_1 = T1/(T1+T2),$ $w_2 = T2/(T1+T2);$ wherein,
T1 and T2 represent the recognition accuracy of a validation set in the RGB branch and the optical flow branch, respectively, during the process of constructing the 3D convolutional neural network model.

* * * * *